United States Patent
Uesugi

[15] 3,704,658
[45] Dec. 5, 1972

[54] UNIVERSALLY ADJUSTABLE MOUNT FOR A CAMERA OBJECTIVE LENS

[72] Inventor: Kyozo Uesugi, Osaka, Japan
[73] Assignee: Minolta Camera Kabushiki Kaisha, Osaka-shi, Japan
[22] Filed: Nov. 13, 1970
[21] Appl. No.: 89,322

[30] Foreign Application Priority Data
Nov. 27, 1969    Japan .....................44/95562

[52] U.S. Cl. ..................95/50, 350/247, 350/252, 95/51
[51] Int. Cl. ............................................G03b 5/06
[58] Field of Search .......95/50, 51; 355/52; 350/247, 350/252

[56] References Cited

UNITED STATES PATENTS

| | | | |
|---|---|---|---|
| 321,139 | 6/1885 | Samuels | 95/51 X |
| 2,293,598 | 8/1942 | Drucker | 95/51 X |
| 2,285,768 | 6/1942 | Drucker | 95/50 X |
| 3,563,637 | 2/1971 | Ferguson | 355/46 X |

FOREIGN PATENTS OR APPLICATIONS

214,322    10/1909    Germany......................95/50

Primary Examiner—John M. Horan
Assistant Examiner—Alan A. Mathews
Attorney—Stanley Wolder

[57] ABSTRACT

A universally adjustable mount for a camera objective lens includes an axially adjustable barrel provided with a pair of transversely spaced ears having axially aligned first bores. An elongated frame is located between the ears and is provided with oppositely directed pins slideably and rotatably engaging the ear bores and has opposed second bores therein along a transverse axis perpendicular to the axis of the first bores. The objective lens barrel projects through the frame and is provided with opposite outwardly directed radial pins engaging the second bores. A flexible bellows interconnects the two barrels.

7 Claims, 2 Drawing Figures

PATENTED DEC 5 1972

3,704,658

INVENTOR
KYOZO UESUGI
BY Stanley Wolder
ATTORNEY

UNIVERSALLY ADJUSTABLE MOUNT FOR A CAMERA OBJECTIVE LENS

BACKGROUND OF THE INVENTION

The present invention relates generally to improvements in adjustments for camera objective lenses and it relates particularly to an improved objective lens mounting which permits the universal angular adjustment of the objective lens as well as its translational adjustment in a plane parallel to the camera film plane.

In the conventional camera the objective lens is mounted with its optical axis perpendicular to the camera film plane and is only axially adjustable for focusing purposes. However, there are special types of cameras such as studio cameras and architectural cameras in which there are provided mechanisms for adjusting the position of the objective lens in a direction parallel to the camera film plane and mechanism for adjusting the angle of the objective lens about a transverse horizontal or vertical axis through the optical axis. However, these devices are either capable only of angular or translational adjustment, and although mechanisms have been available for accomplishing both of these adjustments such mechanisms have been very complex and expensive devices, inconvenient to handle and manipulate and frequently unreliable.

Another drawback of the conventional objective lens tilting and transverse adjustment mechanisms is that they are not practically adaptable for use in single lens reflex cameras provided with preset automatic diaphragm setting mechanisms since the automatic diaphragm setting operation cannot be performed when the objective lens is tilted or transversely moved in a direction parallel to the camera film plane. This is consequent to the incomplete interlocking between the lens barrel and the camera body, since in the automatic diaphragm single lens reflex camera, the iris diaphragm blades disposed in the lens barrel are interlocked with a diaphragm actuating member in the camera body and the tilting of the objective lens is effected by rotating the lens barrel about the optical axis. Thus the objective lens adjustment mechanism heretofore available are of little adaptability and other wise leave much to be desired.

SUMMARY OF THE INVENTION

It is a principal object of the present invention to provide an improved camera objective lens adjustment.

Another object of the present invention is to provide an improved mechanism for angularly and translationally adjusting the objective lens on a camera.

Still another object of the present invention is to provide an improved mechanism for the swinging adjustment of a camera objective lens about a plurality of axes and for the translational adjustment thereof in a plane parallel to the camera film plane.

A further object of the present invention is to provide an improved mechanism for universally adjusting the angle of a camera objective lens and for universally adjusting it in directions parallel to the plane of the camera film plane.

Still a further object of the present invention is to provide an improved angular adjustment for camera objective lenses which are adapted for use with automatic preset diaphragm single lens reflex cameras.

Another object of the present invention is to provide an adjustment mechanism of the above nature characterized by its simplicity, ruggedness, reliability, versatility, and low cost.

The above and other objects of the present invention will become apparent from a reading of the following description taken in conjunction with the accompanying drawing which illustrates a preferred embodiment thereof.

In a sense the present invention contemplates the provision of a camera objective lens adjustment comprising a longitudinal first barrel supporting an objective lens system, a bracket member, means mounting said first barrel to said bracket member for restricted linear movement relative thereto along a first transverse axis and for swinging about said first transverse axis, means mounting said bracket on said camera for restricted linear movement along a second transverse axis at an angle to said first axis and for swinging about said second axis, and means including a flexible member providing light tight communication between said barrel and the camera.

The preferred form of the improved adjustment mechanism includes a longitudinally adjustable barrel provided with a coupling for mounting it to the camera body, the barrel being provided with diametrically opposed outwardly positioned forwardly directed ears having second bores aligned with the second axis, as aforesaid, and the bracket is in the shape of an elongated frame provided with outwardly directed pins slideably and rotatably engaging respective second bores. The lens barrel is provided with outwardly opposite radially projecting pins which slideably rotatably engage respective bores in the bracketframe aligned with the first axis. A flexible bellows interconnects the confronting ends of the barrels.

The improved universal adjustment for camera objective lenses is simple, rugged, reliable, highly versatile, inexpensive and easy and convenient to use. Moreover, it is easily and readily adaptable for use in single lens reflex cameras provided with automatic preset diaphragm controls.

DESCRIPTION OF THE PREFERRED EMBODIMENT

Figure 1:
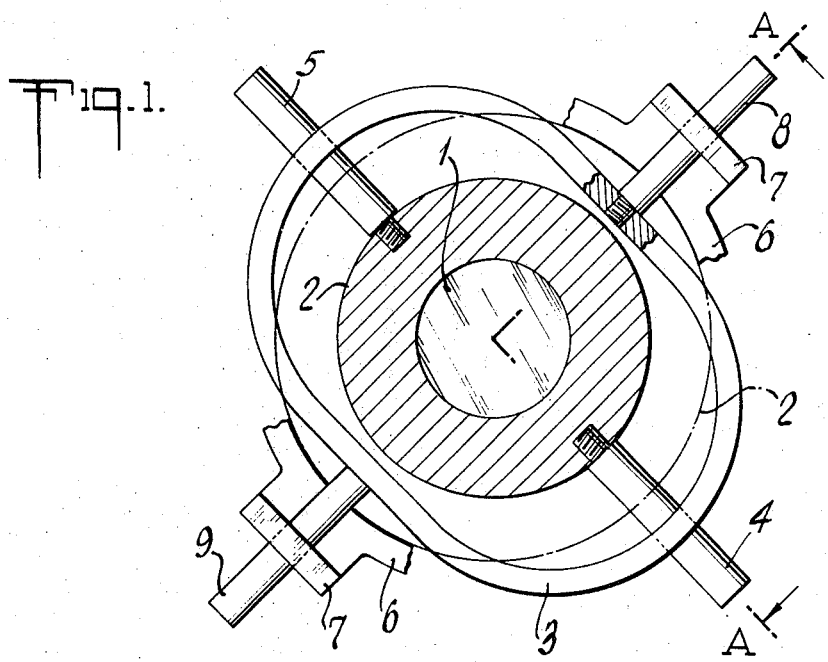
FIG. 1 is a fragmentary, partially sectional front elevational view of an objective lens adjustment embodying the present invention and adapted for use in a preset automatic diaphragm single lens reflex camera.
Figure 2:
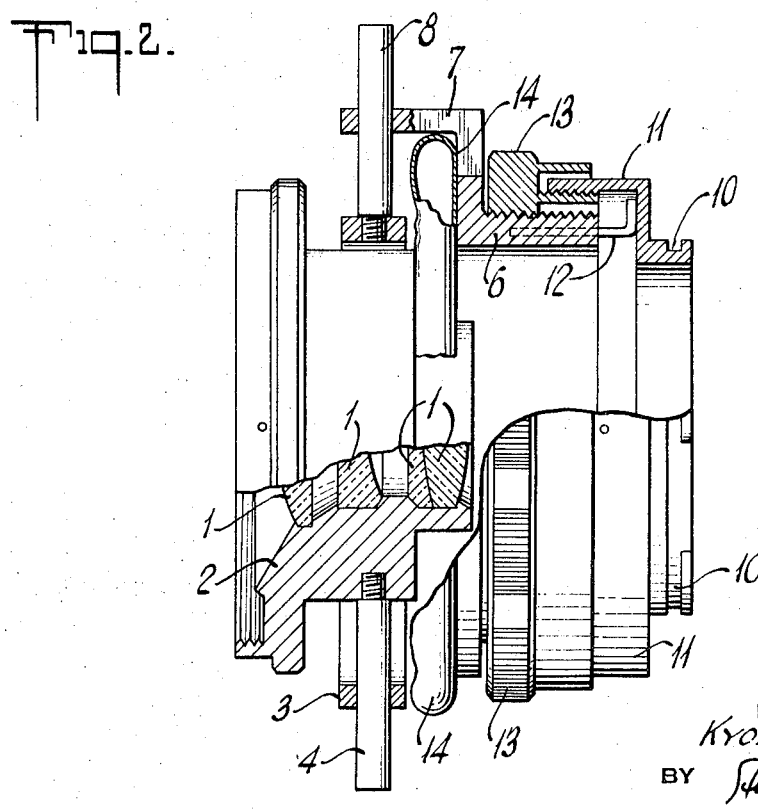
FIG. 2 is a side partial sectional view taken along line AOB in FIG. 1.

Referring now to the drawing which illustrates a preferred embodiment of the present invention in the form of an interchangeable objective lens assembly for a single lens reflex camera, the reference numeral 1 generally designates an objective lens system which is axially longitudinally disposed in a lens barrel 2, it being understood that the lens system 1 may be otherwise carried by lens barrel 2 and may be replaceably mounted thereto. Also disposed in barrel 2 is an adjustable lens diaphragm (not shown), which may be of conventional construction.

The lens barrel 2 is mounted in a bracket defining elongated transversely extending frame 3, which is illustrated as being of elongated oval shape, but may assume any other suitable shape. Medially formed in the opposite legs of bracket frame 3 are a pair of axially aligned bores which are slideably and rotatably engaged by a pair of axially aligned elongated pins 4 and 5 which are connected to lens barrel 2 and diametrically oppositely project therefrom. Thus lens barrel 2 is slideable along the direction of the axis of pins 4 and 5 and is rotatable about this axis, such axis being transverse and intersecting the optical axis of objective lens 1 and being parallel to or forming an angle with the camera film plane depending on the mechanism adjustment.

An axially adjustable longitudinal mounting barrel 6 is provided with a pair of outwardly spaced diametrically opposed forwardly directed arms or ears 7 having formed therein opposed bores which are aligned with a transverse axis advantageously intersecting the axis of pins 4 and 5 and parallel to the camera film plane and forming an angle with the axis of pins 4 and 5, preferably 90°, although other angular relationships may be employed. The barrel 6 extends into and is coaxial with a mounting barrel 11 provided at its rear with a conventional coupling section 10 permitting the coupling thereof to a mating coupling section on a camera body.

A longitudinal guide element or key 12 affixed to barrel 11 projects forwardly into sliding engagement with a longitudinal guideway in the wall of barrel 6 to restrict barrel 6 to axial movement. A focusing or distant setting ring 13 is rotatably supported on the forward end of barrel 11 and ring 13 and barrel 6 are provided with interengaging helical slot or guide and follower, or mating helical threads of known construction whereby axial adjustment of barrel 6 is effected by the rotation of ring 13. A single fold flexible light tight bellows 14 formed of any suitable opaque material interconnects the confronting ends of barrels 2 and 6 to provide light tight communication between the barrels while permitting relative angular and translational adjustment thereof. In order to facilitate the setting of the lens barrel 2 devices or mechanisms of known construction may be provided, for example, conventional clamping means such as a screw clamp associated with pins 4 and 5 or 8 and 9.

The operation of the improved lens barrel adjustment mechanism is clear from the above description. The transverse adjustment of lens barrel 2 in transverse directions or parallel to the camera film plane is accomplished by moving or shifting lens barrel 2 to axially slide pins 4 and 5 in corresponding bores in bracket 3 and to axially slide pins 8 and 9 in corresponding bores in ears 7 in directions and at relative rates and amounts in accordance with the desired direction and distance of movement of barrel 2. Angular adjustment of barrel 2 is accomplished merely by swinging the barrel about the desired transverse axis, pins 4 and 5 rotating in corresponding bores in bracket 3, and bracket 3 swinging about the axis of pins 7 and 8 which rotate in the respective bores in ears 7, the relative rates and amounts, and the directions of rotation of the pins depending on the amount and axis of swinging of barrel 2. Thus barrel 2 can be angularly adjusted about horizontal and about vertical transverse axis or about any transverse axis and can be horizontally or vertically adjusted or can be translationally adjusted in any direction parallel to the camera film plane.

It is important to note that the lens barrel 2 does not rotate about its longitudinal axis and is fixed relative thereto independent of the other movements of barrel 2 and as a consequence the diaphragm may be coupled to the conventional diaphragm automatic preset control mechanism which is located in the camera body and this mechanism will reliably and accurately control the diaphragm while permitting the angular and translational adjustment of the lens barrel 2. Where such automatic preset mechanism is employed, it is advantageously partially mounted in lens barrel 2 and in outer barrel 11 and these two portions are connected by way of a flexible member so that the automatic diaphragm setting operation is not disturbed by an adjustment of lens barrel 2. Another advantage resulting from the barrel 2 not rotating about its longitudinal axis is that the diaphragm adjusting ring is constantly maintained in a position of optimum visual accessibility.

While there has been described, and illustrated a preferred embodiment of the present invention, it is apparent that numerous alterations, omissions, and additions may be made without departing from the spirit thereof.

What is claimed is:

1. A camera objective lens adjustment comprising a longitudinal first barrel supporting an objective lens system, a bracket member, means mounting said first barrel to said bracket member for restricted linear movement relative thereto along a first transverse axis and for swinging about said first transverse axis, means mounting said bracket on said camera for restricted linear movement along a second transverse axis at an angle to said first axis and for swinging about said second axis, means including a flexible member providing light tight communication between said barrel and the camera, and a second barrel provided with means for mounting on the camera, said bracket being mounted on said second barrel.

2. The camera objective lens adjustment of claim 1 wherein said flexible member comprises a bellows interconnecting said first and second barrel members.

3. The camera objective lens adjustment of claim 2 wherein said second barrel is axially adjustable.

4. The camera objective lens of claim 3 wherein said bracket mounting means comprises a pair of transversely spaced forwardly directed ears having second bores therein aligned along said second axis and a pair of oppositely directed second pins projecting from said bracket and slideably and rotatably engaging said bores.

5. The camera objective lens of claim 4 wherein said bracket has a pair of first bores formed therein aligned along said first axis and said first barrel mounting means includes axially aligned first pins projecting from said barrel and slideably and rotatably engaging said first bores.

6. The camera objective lens adjustment of claim 1 wherein said second barrel is positioned rearwardly of said first barrel, said bracket including a frame having a pair of first bores therein aligned with said first axis, said first barrel mounting means including a pair of oppositely directed pins projecting from said first barrel and slideably and rotatably engaging said first bores, said bracket mounting means including a pair of diametrically opposed ears projecting forwardly of said second barrel and having second bores therein aligned with said second axis, and opposite pins projecting outwardly from said bracket and slideably and rotatably engaging said second bores, said flexible member comprising a bellows interconnecting said first and second barrels.

7. The camera objective lens adjustment of claim 6 wherein said first and second axes are at right angles to each other.

* * * * *